Sept. 15, 1970 P. E. BARTON ET AL 3,528,541
BALANCED OSCILLATING CONVEYOR
Filed March 18, 1968 2 Sheets-Sheet 1

INVENTORS
PAUL E. BARTON
WILLIAM E. PROWANT
BY *their attorneys,*
Learman, Learman & McCulloch Sept. 15, 1970 P. E. BARTON ET AL 3,528,541
BALANCED OSCILLATING CONVEYOR
Filed March 18, 1968 2 Sheets-Sheet 2
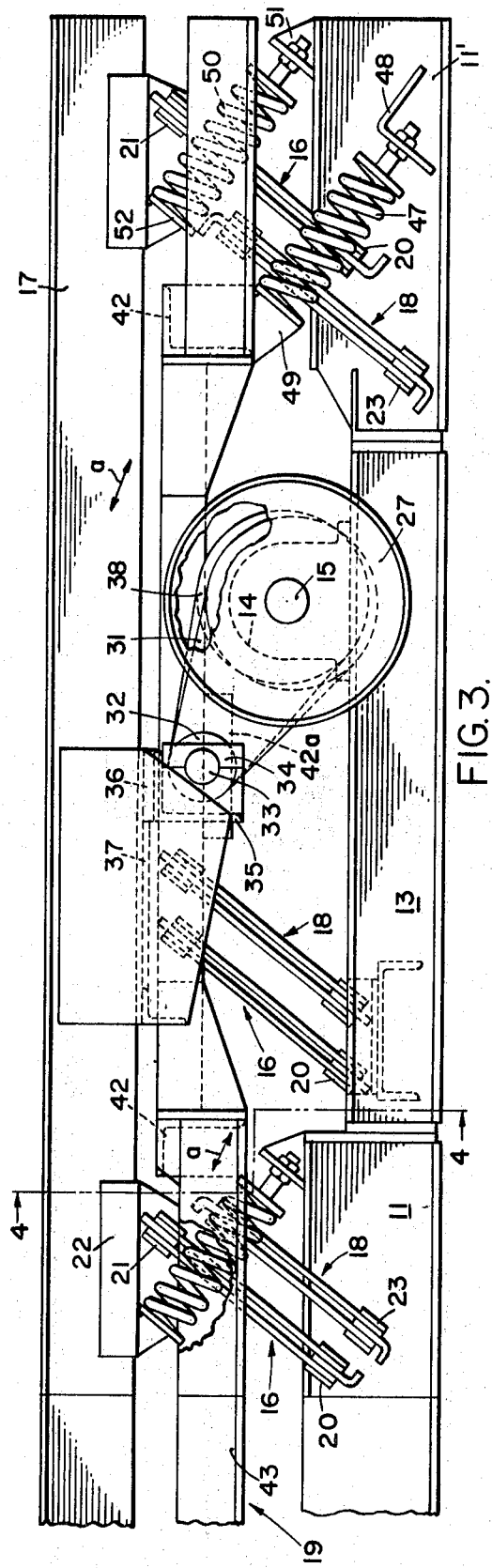
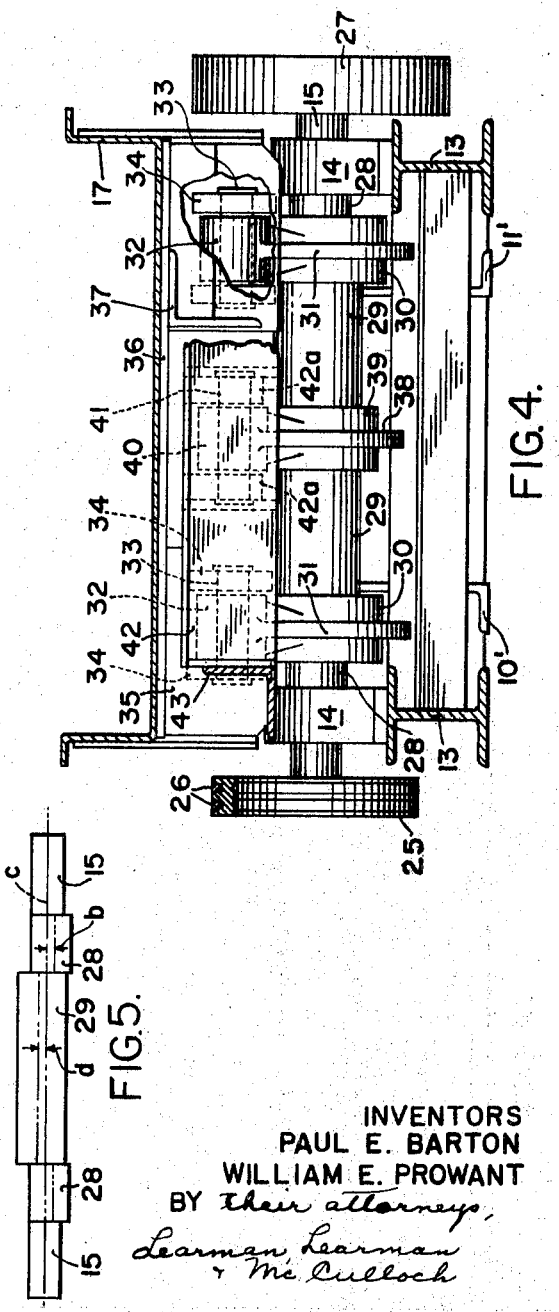
INVENTORS
PAUL E. BARTON
WILLIAM E. PROWANT
BY *their attorneys,*
Learman Learman
& McCulloch ial extending material conveying pan 17 which is vibrated at a predetermined angle relative to its generally horizontal plane to move the material or product on the pan in a forward direction from right to left in FIGS. 1 and 3, the pan being vibrated along the inclined path $a$ to move the material continuously forwardly and upwardly incrementally along the length of the path. Similar parallel leaf spring assemblies 18 support a counterbalancing mass assembly generally designated 19 for vibration or oscillation in phase opposition in the same inclined path $a$.

3,528,541
BALANCED OSCILLATING CONVEYOR
Paul E. Barton and William E. Prowant, Durand,, Mich., assignors to Simplicity Engineering Company, Durand, Mich., a corporation of Michigan
Filed Mar. 18, 1968, Ser. No. 713,819
Int. Cl. B65g 27/00
U.S. Cl. 198—220                                    13 Claims

ABSTRACT OF THE DISCLOSURE

A vibrating conveyor wherein a longitudinally extending pan is mounted on a base and oscillated in a generally linear path inclined relative to the general plane of the pan to forward material on the pan, a balancing weight assembly is supported for oscillation in a parallel path, and a transverse drive shaft having a pair of 180° out-of-phase, equally eccentric portions connected, respectively, to the pan and weight assembly oscillate them synchronously in opposite directions so that harmful vibration is not transmitted to the base.

---

One of the prime objects of the invention is to provide a vibrating conveyor having 180° out-of-phase eccentric portions on its drive shaft which connect directly to a load-carrying pan and balancing weight assembly in a positive manner to oscillate them at the same frequency regardless of the speed of rotation of the drive shaft at a particular time during the operation of the machine.

Another object of the invention is to provide a balanced conveyor of the character described wherein a balancing weight mass is oscillated by the drive shaft for the purpose of developing inertia forces which oppose the inertia forces developed by an oscillating material conveying pan and have a cancelling effect upon them.

Still a further object of the invention is to provide a balanced conveyor of relatively simple construction which may be manufactured and assembled at reasonable cost and used on elevated supports, steel fabrications, or in areas where foundation vibration cannot be tolerated.

Other objects and advantages of the invention will be pointed out specifically or will become apparent from the following description when it is considered in conjunction with the appended claims and the accompanying drawings, in which:

FIG. 3 is an enlarged side elevational view of the charge end of the conveyor;

FIG. 4 is a transverse sectional view, taken on the line 4–4 of FIG. 3; and

FIG. 5 is a plan view of the drive shaft only.

Figure 1:
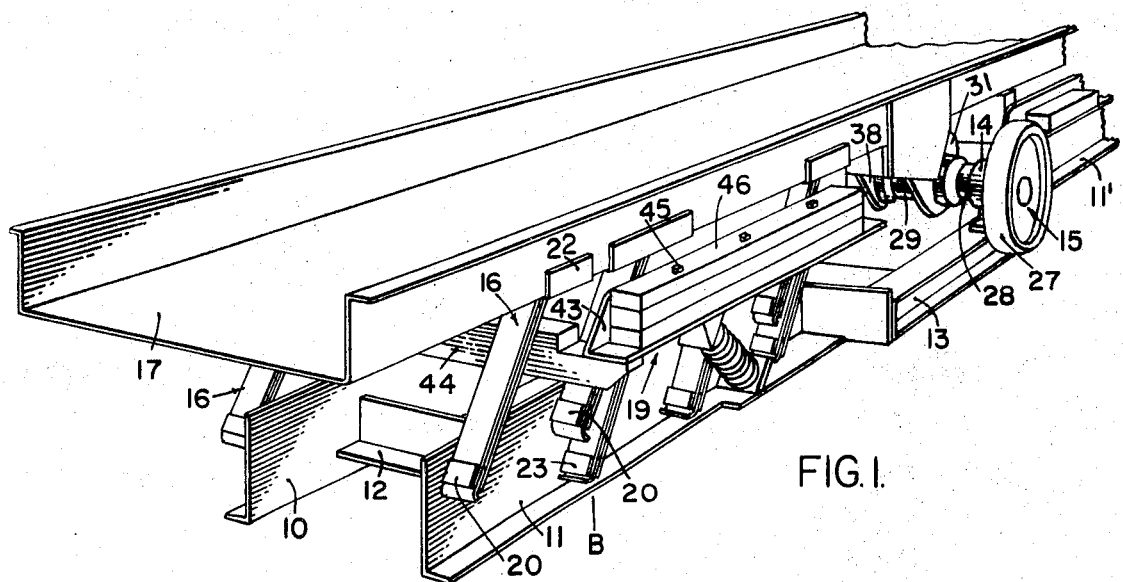
FIG. 1 is a perspective elevational view of the discharge end of the conveyor.
Figure 2:
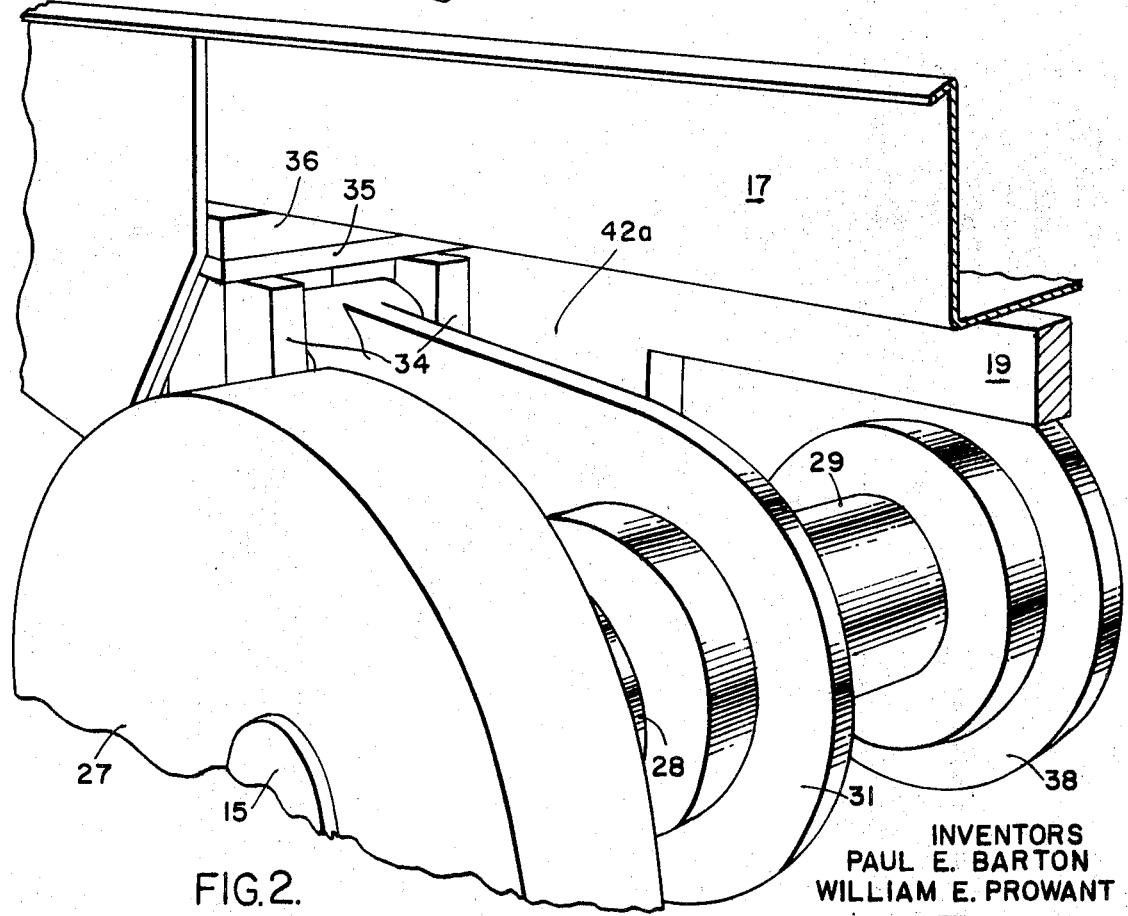
FIG. 2 is a greatly enlarged fragmentary perspective elevational view showing a portion of the drive shaft assembly.

Referring now more particularly to the accompanying drawings wherein a preferred embodiment of the invention only is shown, a letter B generally indicates a base or frame assembly which may include spaced apart side rail members 10 and 11 at one end of the machine connected by cross brace members 12, and similar spaced apart rail members at the front or discharge end of the machine identified by identical numerals which are primed to distinguish them. Connecting the members 10 and 11 and 10' and 11' are intermediate longitudinally disposed framework portions 13 at each side of the machine which support bearings 14 for a drive shaft which is generally designated 15. Longitudinally spaced, vertically inclined leaf spring assemblies generally designated 16 connected with the base B support a U-shaped longitudinally ex- The leaf spring assemblies 16 are mounted on the side frame members 10 and 11, 10' and 11', and 13 by retaining caps 20 and connect to retaining caps 21 supported from the pan 17 by plates 22. Similarly retaining caps 23 on the side base members 10 and 11, 10' and 11', and 13 support the leaf spring assemblies 18 which at their opposite ends are connected to retaining caps 24 fixed to the counterbalance assembly 19.

The drive shaft 15 mounts a drive shaft pulley 25 at one end which is connected by a plurality of belts 26 to a suitable electric motor for driving the shaft assembly 15 at operating speed. Mounted on the opposite end of the shaft 15 is a flywheel 27 which functions in the usual manner with the aid of the pulley 25 to maintain the momentum of the drive shaft 15.

As FIG. 5 indicates, a pair of eccentric portions 28 are formed on the drive shaft 15 adjacent each end of the drive shaft, the eccentric portions 28 having an eccentricity $b$ with respect to the axis $c$ of the drive shaft 15. Adjacent the eccentric portions 28 is a central eccentric portion 29 having an eccentricity $d$ with respect to the axis $c$ of shaft 15 which is equal to the eccentricity $b$ and 180° out of phase with it. In a typical installation the eccentricities $b$ and $d$ may be $\frac{3}{8}''$ when the shaft 15 is substantially three inches in diameter, the eccentric portions 28 are $3\frac{3}{4}''$ in diameter and the eccentric portion 29 is $5\frac{1}{2}''$ in diameter. It is thought that less counterweights need be used if the eccentricity $d$ is increased relative to the eccentricity $b$.

Sealed roller bearings 30 journaling the eccentric portions 28 of the shaft 15 are provided on drive arms 31 which positively connect the eccentric portions 28 to the pan 17 and impart the oscillation of the portions 28 thereto. The drive arms 31 are also provided with sealed roller bearing members 32 at their upper ends which journal conveying pan pins 33. The pins 33 are fixed to the pan 17 by clamp blocks 34 mounted on plates 35 which depend from the under surface of the pan. Cross plate members 36 and angle members 37 serve to reinforce the pan 17 and increase its load carrying capacity.

Intermediate the drive arms 31 is a central drive arm 38 having a lower end, sealed bearing 39 journaling the eccentric portion 29 of the shaft 15. At its upper end, the arm 38 has a sealed roller bearing 40 pivotally connecting it with a pin 41 fixed to a counterweight assembly 19 crossplate 42 by clamp blocks 42a. Thus, at the time a forwarding movement is transmitted to the pan 17 by the drive arm 31, an equal and opposite movement is transmitted by the drive arm 38 to the balance weight assembly 19.

As previously mentioned and as FIGS. 1, 3 and 4 particularly indicate, the balance mass assembly 19 includes the transversely extending connecting member 42, which connects balance mass assembly side angle members 43. In addition, other transversely extending members 44 (see FIG. 1) also connect the side angle members 43 for movement in unison. Bolt and nut assemblies generally designated 45 releasably secure weight bars 46 to the angle members 43.

Provided to assist the drive shaft bearings 14, and aiding them in carrying the load of the balancing mass assembly 19, are coil springs 47, connected between angle mount members 48 on the base members 10 and 11, and 10' and 11', and support blocks 49 on the balancing mass assembly 19. Similarly, coil springs 50 may be connected between mount members 51, provided on the side base members 10 and 11 and 10' and 11' and mount members 52, provided on the pan 17, to assist the drive shaft 15 in bearings 14 to carry the weight of the pan 17 and its load.

In operation, the drive pulley 25 drives the shaft 15 at a continuous speed which may typically be 450 r.p.m.'s. Material received on the right end of the conveyor pan 17 (see FIG. 1) is moved forwardly on the pan 17 in increments by the oscillation transmitted to pan 17 by the eccentric portions 28 and drive arms 31, the eccentric portions 28 and drive arms 31 constituting positive eccentric drive means for vibrating the pan 17. At the same time, an equal and opposite oscillation is imparted to the balancing mass assembly 19 by the eccentric portion 29 and drive arm 38, the eccentric portion 29 and drive arm 38 constituting positive eccentric drive means for vibrating the eccentric mass assembly 19 equally and oppositely at the same frequency. Because the balancing weight assembly 19 and pan 17 are both positively driven by the drive shaft 15, there are no relative variations in their frequencies during start-up, for instance, when the speed of the shaft 15 increases from 0 r.p.m.'s to the speed at which the shaft is normally driven. There need be no concern with the natural frequency of drive springs and the conveyor is versatile in the sense that the speed at which the conveyor pan is oscillated can be changed to meet conditions.

The empty pan is balanced at the time it leaves the factory by the addition of the required number of weights 46. In the field, however, additional weights may be added to balance the pan 17 for the average load it is anticipated that the pan 17 will carry at any one time. Clearly it will be a simple matter to add or subtract weights 46 in the field, as deemed necessary.

It is advantageous to have the drive arms 31 at the sides of the shaft 15 connect with the pan 17 because the load on the pan from side to side is not always uniform. The balancing mass assembly 19, however, can easily be driven by a single drive arm because it is not subjected to uneven loading.

The conveyor is well suited to conveying castings, machine parts, and sand and other particulate bulk materials. The leaf spring assemblies 16 support the weight of the pan 17 and cut down the driving force necessary to oscillate the pan because they are resilient and snap back. The coil springs 50 support the load which the pan carries.

It is to be understood that the drawings and descriptive matter are in all cases to be interpreted as merely illustrative of the principles of the invention rather than as limiting the same in any way, since it is contemplated that various changes may be made in the various elements to achieve like results without departing from the spirit of the invention or the scope of the appended claims.

We claim:

1. In an oscillating conveyor: base means; longitudinally extending load carrying pan means supported thereby for oscillation in a generally linear path inclined to the general plane of the pan means to forward material on the pan means; fixed weight inertia mass means of substantially the weight of said pan means and unaffected by the travel of material also supported for oscillation in such a path; drive shaft means transversely disposed relative to said pan means; means for revolving said drive shaft means; eccentric drive means positively connected between said drive shaft means and pan means to impart oscillation thereto; and 180° out of phase, eccentric drive means positively connected with said drive shaft means and inertia mass means to simultaneously impart oscillation to said inertia mass means and thereby balance said pan means so that harmful vibration is not transmitted to said base means, said pan means consisting of material conveying means.

2. The conveyor as defined in claim 1 in which said entire inertia mass means substantially lies within the longitudinal extent of said load carrying pan means.

3. The combination defined in claim 2 in which said inertia mass means comprises vertically stacked longitudinally extending weight bars.

4. The conveyor defined in claim 1 in which each eccentric drive means includes an eccentric portion formed on said drive shaft means and a drive transmitting arm journaled on said eccentric portion.

5. The conveyor defined in claim 1 in which said drive shaft means comprises a drive shaft journaled for rotation on said base means beneath said pan means; said eccentric drive means connected between the drive shaft means and pan means includes a pair of transversely spaced side eccentric portions on said drive shaft and a pair of drive transmitting arms journaled on said portions and connected to said pan means; and said eccentric drive means connected between the drive shaft means and inertia mass means comprises a central eccentric portion on said drive shaft and a drive transmitting arm journaled thereon and connected centrally to the inertia mass means.

6. The conveyor defined in claim 5 in which said inertia mass means comprises longitudinally extending weight carriers under each side of the pan means with weight bars detachably secured thereto.

7. The conveyor defined in claim 6 in which said weight bars are supported in superposed relation.

8. The conveyor defined in claim 5 in which diagonally disposed leaf spring assemblies are connected to the base means and extend rearwardly to connect to the pan means to support the pan means therefrom.

9. The conveyor defined in claim 8 in which diagonally disposed coil springs mounted on the base means extend forwardly to support the pan means.

10. The combination defined in claim 8 in which diagonally disposed leaf spring assemblies are connected to the base means and extend rearwardly to connect to the inertia mass means to support the inertia mass means therefrom.

11. The combination defined in claim 10 in which diagonally disposed coil springs mounted on the base means extend forwardly at an inclined angle to support the inertia mass means.

12. In an oscillating conveyor: base means; longitudinally extending load carrying pan means supported thereby in a first plane for oscillating in a generally linear path inclined to the general plane of the pan means to forward material on the pan means; inertia mass means of substantially the weight of said pan means entirely supported in a second plane vertically spaced from said first plane for oscillation in such a path; drive shaft means transversely disposed relative to said pan means; means for revolving said drive shaft means; eccentric drive means positively connected between said drive shaft means and pan means to impart oscillation thereto; and 180° out of phase, eccentric drive means positively connected with said drive shaft means and inertia mass means to simultaneously impart oscillation to said inertia mass means and thereby balance said pan means so that harmful vibration is not transmitted to said base means.

13. The combination as set forth in claim 12 wherein said inertia mass means and said load carrying pan means are supported on vertically inclined support means which substantially lie within the longitudinal extent of said load carrying pan means.

References Cited

UNITED STATES PATENTS

| | | | |
|---|---|---|---|
| 2,669,344 | 2/1954 | Flint | 198—220 |
| 2,854,130 | 9/1958 | Adams | 198—220 |
| 3,180,158 | 4/1965 | Morris | 198—220 |

ANDRES H. NIELSEN, Primary Examiner